United States Patent [19]
Ogiso et al.

[11] 3,718,075
[45] Feb. 27, 1973

[54] EXPOSURE CONTROLLING DEVICE FOR A CAMERA

[75] Inventors: Mitsutoshi Ogiso, Tadashi Ito, both of Kanagawa-ken, Japan

[73] Assignee: Canon Kabushiki Kaisha, Tokyo, Japan

[22] Filed: Nov. 23, 1970

[21] Appl. No.: 91,889

[52] U.S. Cl. ............95/10 CT, 95/53 EA, 95/53 EB
[51] Int. Cl. .......................G03b 9/62, G03b 7/08
[58] Field of Search............95/10 CT, 53 EB, 53 EA

[56] References Cited

UNITED STATES PATENTS

| | | | |
|---|---|---|---|
| 3,643,563 | 2/1972 | Nobusawa | 95/10 CT |
| 3,643,561 | 2/1972 | Numata | 95/10 CT |
| 3,347,141 | 10/1967 | Nobusawa et al. | 95/10 CT |
| 3,324,779 | 6/1967 | Nobusawa et al. | 95/10 CT |
| 3,533,348 | 10/1970 | Yanagi | 95/10 CT |
| 3,470,798 | 10/1969 | Miyakawa | 95/10 CT |

*Primary Examiner*—John M. Horan
*Assistant Examiner*—Russell E. Adams, Jr.
*Attorney*—McGlew and Toren

[57] ABSTRACT

In the disclosed camera exposure control, a capacitor charged to a predetermined potential, is discharged for a predetermined time at a rate established by light passing through a preset iris in the lens of the camera. After the predetermined time, the residual charge across the capacitor serves as a memory value for controlling the camera's shutter.

6 Claims, 5 Drawing Figures

INVENTORS
MITSUTOSHI OGISO
BY TADASHI ITO

McGlew and Toren
ATTORNEYS

EXPOSURE CONTROLLING DEVICE FOR A CAMERA

This invention relates to exposure control systems, and particularly, although not exclusively, to exposure control systems for single lens reflex cameras.

According to a feature of the invention, a capacitor is charged to a predetermined electrical potential. It is then discharged for a predetermined time at a rate established by light striking light-variable photoresistive means through light limiting means. The residual charge across the capacitor controls the exposure. The capacitor thus serves as a memory for the brightness of the light striking the photoresistive means.

According to another feature of the invention, the photoresistive means is a photoconductive element.

According to another feature of the invention, the light varying means is a variable iris mounted in a photographic lens.

These and other features of the invention are pointed out in the claims. The various objects and advantages of the invention will become evident from the following detailed description when read in light of the accompanying drawings.

Figure 1:
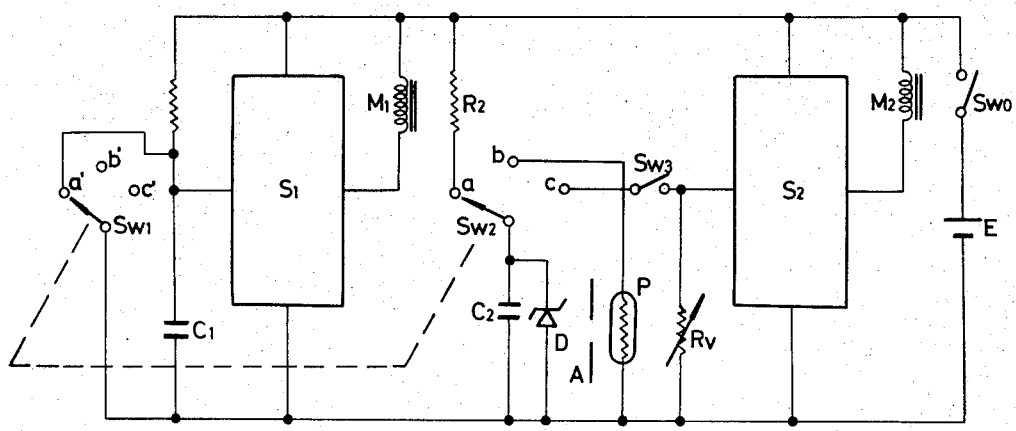
FIG. 1 is a schematic, partially block, diagram of an exposure control device embodying features of the invention.

In FIG. 1, switching circuits $S_1$ and $S_2$ may each consist of any known device such as a Schmitt circuit, a bridge circuit, a differential circuit, a monostable multivibrator circuit or the like. Respective switches $Sw_1$, $Sw_2$ and $Sw_3$ are changed over at times shown in FIG. 5. An electromagnet $M_1$ serves to lift or draw up a reflex mirror and to flip the switch $Sw_2$ from a terminal $b$ to a terminal $c$, while another electromagnet $M_2$ releases a focal plane shutter.

Fixed resistors $R_1$ and $R_2$ form respective charging paths to capacitors $C_1$ and $C_2$ through respective ganged selector switches $Sw_1$ and $Sw_2$ when the latter are set to terminal $a'$ and terminal $a$ of their respective sets of terminals $a'$, $b'$, and $c'$ and $a$, $b$, and $c$. A photoconductive element P discharges the capacitor $C_2$ when the switches $Sw_1$ and $Sw_2$ are switched to terminals $b'$ and $b$. An iris A varies the light impinging upon the photoconductive element P and a Zener diode D establishes a fixed maximum potential across the capacitor $C_2$. Electrical current is supplied from an electrical power source E through a starting switch $Sw_0$.

Figure 2:
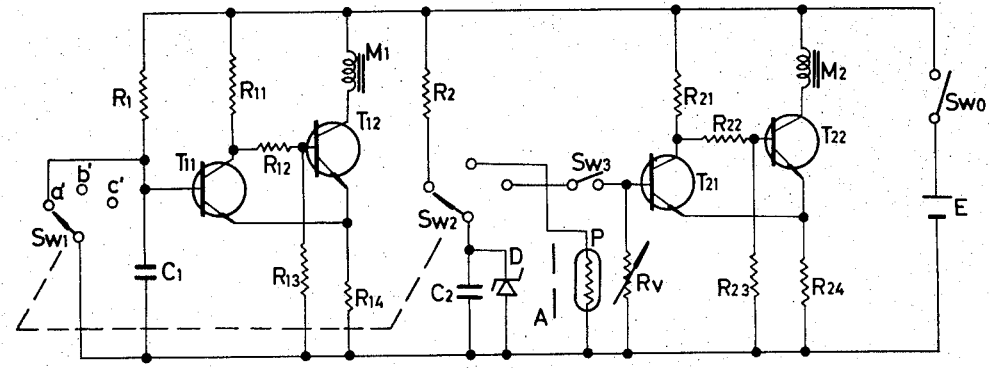
FIG. 2 is a schematic circuit diagram of the device in FIG. 1 but illustrating examples of the details of the exposure control device in FIG. 1.

FIG. 2 is same as FIG. 1 but showing details of the switches $S_1$ and $S_2$. In the drawing $T_{11}$, $T_{12}$; $T_{21}$, $T_{22}$ are transistors while $R_{11}$, $R_{12}$, $R_{13}$, $R_{14}$, $R_{21}$, $R_{22}$, $R_{23}$ and $R_{24}$ are a resistor.

Figure 3:
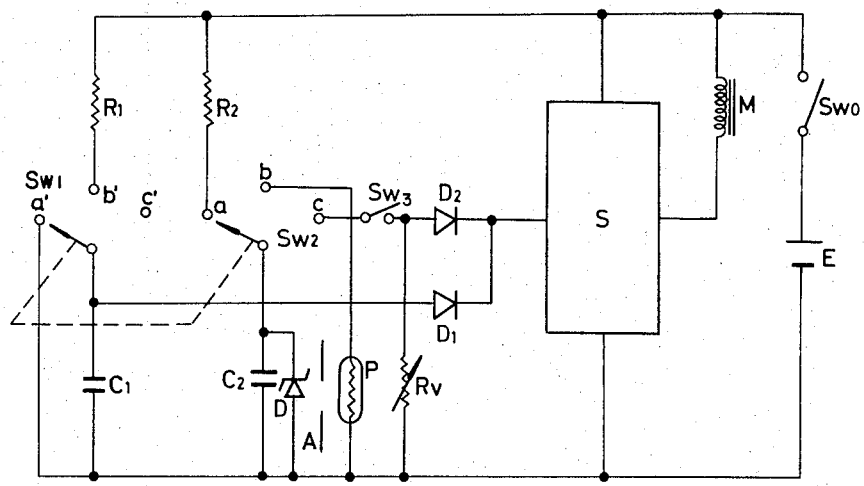
FIG. 3 is a schematic block diagram illustrating another exposure control embodying features of the invention.

FIG. 3 is the electrical wiring diagram showing the switching circuits $S_1$ and $S_2$ in FIG. 1 and 2 combined. In the drawing an electro magnet M serving as $M_1$ and $M_2$ is connected to a common switching circuit S serving as $S_1$ and $S_2$, while the two inputs to the switching circuit S are connected respectively through the switching diodes $D_1$ and $D_2$ in such a manner that the common switching circuit S is controlled by the larger one of said two inputs. It is at this point that FIG. 3 differs from FIG. 1.

Figure 4:
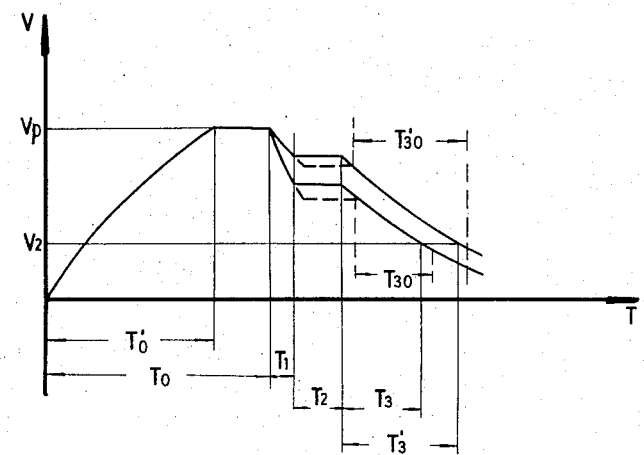
FIG. 4 and 5 are respective explanatory diagrams of the operation of the device embodying the present invention.
Figure 5:
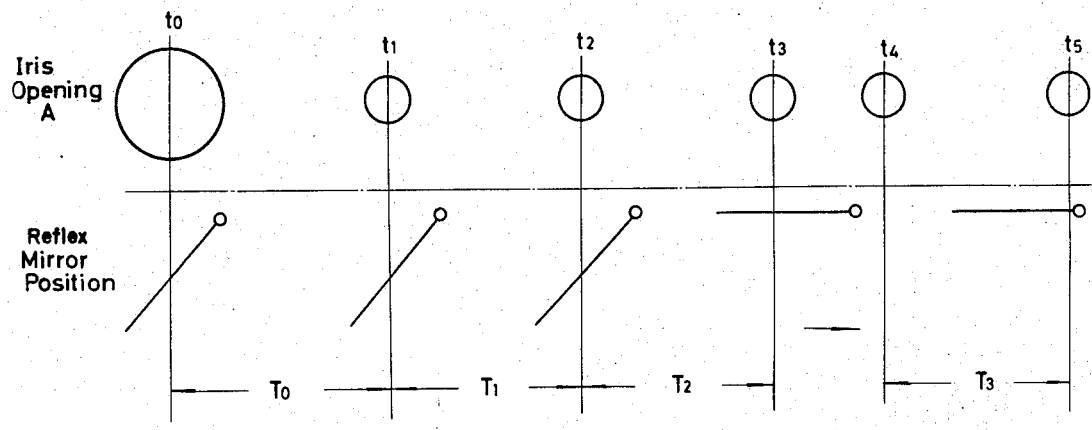

FIG. 4 and 5 are respective explanatory diagrams of the working of the device according to the present invention. FIG. 4 shows the charged state of the capacitor $C_2$. The ordinate shows an electrical potential while the abscissa shows the time. A voltage $V_D$ is determined by the diode D, while $V_2$ is an operating voltage of the time controlling circuit $S_2$ (S).

Although FIG. 3 shows that the operating voltage of the circuit $S_1$ is the same as that of the circuit $S_2$, any compensating circuit or element may be inserted therein or therebetween. Further, the dotted lines show how little the delay of the electromagnet $M_1$ influences the shutter time.

FIG. 5 illustrates the conditions at various times during each operation. At the time $t_0$ the iris is fully open. The operating shutter button releases the automatic iris operating device and causes capacitor $C_2$ to start charging. Between the times $t_0$ and the time $t_1$ the switches $Sw_1$ and $Sw_2$ are switched from the terminals $a'$ and $a$ to the terminals $b'$ and $b$. By the time $t_1$ the iris has been stopped down to its final position and the switches $Sw_1$ and $Sw_2$ have their armatures contacting the terminals $b'$ and $b$.

As shown in FIG. 4 the charging of $C_2$ is completed in a time of $T_0'$ where $T_0' < T_0 + t_1 - t_0$. In a time $T_1$ after the time controlling circuit $S_2$ starts to operate. The reflex mirror begins to be lifted up due to the operation of $M_1$, while at the same time $Sw_2$ is switched from the terminal $b$ to the terminal $c$, which is the state at $t_2$. In a time $T_2$ after this state, namely at $t_3$ a first part of the focal plane shutter starts to run by means of a signal that the mirror has been lifted up. $t_4$ is the time when the switch $Sw_3$ is closed by means of the signal of the start of the first part of the focal plane shutter, and the shutter timer start its counting.

In a time $T_3(T'_3)$ namely at $t_3(t'_3)$, the second part of the focal plane shutter start to run and thus the exposure is finished. Further, FIG. 4 shows that the time $t_3$ is equal to the time $t_4$.

The apparatus in FIGS. 1, 2 and 3 operates as follows. The switch $Sw_0$ is opened when the film is advanced or wound. The act of winding the film also connects the armatures of the switches $Sw_1$ and $Sw_2$ to the terminals $a'$ and $a$, and opens the diaphragm mechanically to its wide open position. When the shutter release button of the camera is pressed it reaches a first position at which it closes the switch $Sw_0$. As a result, current passes through the resistor $R_2$ and charges the capacitor $C_2$. The voltage across the capacitor $C_2$ reaches a maximum value $V_D$ determined by the Zener diode D, within a short time period $T_0'$. When the shutter release button reaches its first position and closes the switch $Sw_0$ it also causes release of the automatic iris diaphragm so that the latter closes to a preset smaller iris opening. This is called the "iris-in" operation. The automatic iris reaches its preset opening after the time period $T_0$. Upon completion of the "iris-in" operation the switches $Sw_1$ and $Sw_2$ are switched so that their armatures contact the terminals $b'$ and $b$. The capacitor $C_1$ now begins to charge through the resistor $R_1$ at a rate determined by the value of this capacitor and resistor. After a lapse of a predetermined time $T_1$ the time control circuit $S_1$ operates the electromagnet $M_1$.

Since the switch $Sw_2$ remains connected with the terminal $b$ from the time when the switch $Sw_1$ is connected to the terminal $b'$ to the time when the electromagnet $M_1$ is actuated, the charge across the capacitor $C_2$ is discharged through the photo-conductive element P receiving the light coming through the opening of the iris A. When the electromagnet $M_1$ operates, the reflex mirror is lifted up and at the same time the switch $Sw_2$ is connected with the terminal C so as to stop the discharge instantaneously during the lifting motion of the reflex mirror. After the mirror is completely lifted up, the film is exposed to the light, the shutter mechanism operated when the switch $Sw_2$ is closed, and the time for counting is started. When the armature of the switch $Sw_2$ contacts the terminal $c$ the charge remaining across the capacitor $C_2$ is equal to the initial charge to the potential $V_D$ less the charge discharged through the photoconductive element P over the time $T_1$. Consequently the greater the amount of light striking the element P through the iris A, the less the residual charge. The smaller the amount of light striking the element P through the iris A, the greater the residual charge across the capacitor. Closure of the switch $Sw_3$ discharges residual charge across the capacitor $C_2$ through the variable resistor $Rv$. When the residual charges across the capacitor $C_2$ is decreased to a certain determined quantity $Q_2$, and the voltage $V_2$ across the capacitor $C_2$ becomes equal to $Qo/C_2$, the switching circuit $S_2(S)$ operates the shutter so as to end the exposure.

As mentioned above at first the capacitor $C_2$ is fully charged. The information concerning the iris diaphragm is passed to the photo-conductive element, making use of the iris diaphragm of the photographic lens. The residual charge across the capacitor $C_2$ as a memory quantity is discharged through the resistor $Rv$ till the electrical potential reaches a certain predetermined value $V_2$. This operates the switching circuit $S_2$ and ends the exposure. Thus, according to the present invention the iris diaphragm of photographic lens can be used for indicating the iris diaphragm opening without elaborate circuits or using a special iris diaphragm opening for the photo conductive element. Thus compactness and the economy of cost are profitably obtained.

As to the operation of the embodiment of FIG. 3, the switch $Sw_0$ is opened, the switches $Sw_1$ and $Sw_2$ are respectively connected to the terminals $a'$ and $a$, and the iris opening A is fully opened for reset by winding up of the film.

At the first step of the shutter release button the switch $Sw_0$ is closed, and the capacitor $C_2$ is fully charged quite soon after the start of the iris-in operation of the automatic iris diaphragm. In response to a signal indicating that the iris diaphragm has been stopped down, the armatures of the switches $Sw_1$ and $Sw_2$ are connected to the terminals $b'$ and $b$. The switching circuit S such as Schmitt circuit or the like operates through the diode $D_1$ with the charged voltage across the capacitor $C_1$. After a predetermined time according to the time constant of $R_1$ and $C_1$, the load M is cut off, and the switch $Sw_2$ is switched over to the terminal C to start lifting of the reflex mirror. During the time $T_1$ since the switch $Sw_2$ is connected with the terminal $b$ until it is switched over to the terminal C. The photographic lens has its iris narrowed to the preset value and the capacitor $C_2$ is discharged through the photoconductive element on the basis of information, i.e., light through, the iris diaphragm. After the mirror lifts up the switch $Sw_3$ is closed. The charge across $C_2$ is discharged through $Rv$ while M remains cut off. At the same time exposure of the film is carried out by the shutter mechanism being operated. When the electrical potential decreases to a given value, the switching circuit such as Schmitt circuit or the like again energizes the electromagnet M to close the shutter mechanism and complete the exposure.

In FIG. 3 the diodes $D_1$ and $D_2$ isolate the time constant circuit composed of resistor $R_1$ and capacitor $C_1$ from the time constant circuit composed of resistor $R_2$ and capacitor $C_2$.

The embodiments of the invention disclosed are susceptible to a number of variations, each of which constitutes another embodiment of the invention. According to such embodiments of the invention:

a. Instead of using a magnet $M_1$, the switch $Sw_2$ is connected to the terminal $b$ for a given time by means a contactless semiconductor such as a transistor, a silicon controlled rectifier or the like. The latter is then turned on and off by a control electrode connected to the circuit $S_1$.

b. Lift-up of the reflex mirror is finished within the time in which the switch $Sw_2$ is changed over from the terminal $b$ to the terminal $c$, so that the switch $Sw_2$ can be eliminated.

c. The light reaching the element P is cut when the mirror is lifted up, so that it is not always necessary to disconnect the element P during the discharge through the resistor $Rv$.

d. An automatic or manual flash is also enabled.

e. Means for the indicating photographic conditions, such as the state of object brightness to be photographed etc. are mounted on the camera, and so on. According to the present invention a capacitor charged up to a certain determined potential is discharged for a predetermined time through a light responsive resistor means such as photo conductive element receiving a light coming through light control means for adjusting the quantity of the light passing through the photographic lens. Thus the present invention can be applied not only for the electronic ally controlled shutter of a single lens reflex camera but also for other purposes. For example, an ampere meter, a lamp or the like can be controlled with said residual charges as memory quantity or for its indication.

While embodiments of the invention have been described in detail it will be obvious to those skilled in the art that the invention may be embodied otherwise without departing from its spirit and scope.

What is claimed is:

1. An exposure control device for a camera having an adjustable iris, comprising capacitor means, charging means connectable to said capacitor means for charging said capacitor means to a predetermined value, discharging means connectable to said capacitor means and including a photoresistive device responsive to light through the iris for discharging said capacitor means at a rate depending on the light through the iris, time controlled switching means for connecting said capacitor means to said charging means and thereafter disconnecting said charging means from said capacitor means and connecting said discharging means to said capacitor means over a predetermined time period before disconnecting said discharging means so as to discharge said capacitor means for a predetermined time period so that the remaining charge on said capacitor means represents a measure of the ambient light, and means for utilizing the remaining charge on said capacitor means for controlling exposure.

2. An exposure control device as in claim 1, wherein the camera includes an electronic shutter and wherein said means for utilizing the charge includes resistive means connectable to said capacitor means for discharging the remaining charge on said capacitor means and a switching arrangement responsive to the voltage across said resistive means reaching a predetermined potential for controlling said shutter.

3. An exposure control device for a single lens reflex camera having a lens, a shutter, shutter opening means and shutter closing means, comprising a photoconductive cell positioned in the camera to receive light passing through the lens, charging means for supplying charge to the capacitor and having switching means for connecting said charging means to said capacitor, said switching means selectively connecting said photoconductive cell in parallel with said capacitor while disconnecting said charging means to predischarge said capacitor on the basis of light on said photoconductive cell, discharging means having an impedance member connected by said switching means in parallel with said capacitor in timed relation with said means for opening the shutter, a switching circuit having an input connected by said switching means to be in parallel with the capacitor and an output coupled to the shutter closing means for responding to the voltage across said capacitor reaching a predetermined level and closing the shutter in response thereto.

4. An apparatus as in claim 3, wherein said switching means includes means for keeping said photoconductive cell connected in parallel with said capacitor for a predetermined time period.

5. An apparatus as in claim 3, wherein said switching means includes an R-C time constant circuit and a second switching circuit, said second switching circuit connecting said capacitor in parallel with said photoconductive cell for a time dependent upon said R-C time constant circuit.

6. An apparatus as in claim 3, wherein said switching means includes first and second switching elements, said first switching element selectively connecting said capacitor to said charging means, said photoconductive cell and said input to said switching circuit, said second switching element including time constant means and connecting said time constant means to the input of said switching circuit when said capacitor is connected by said first switching element to the photoconductive cell.

* * * * *